(12) United States Patent
Suthersan

(10) Patent No.: US 6,632,364 B1
(45) Date of Patent: *Oct. 14, 2003

(54) ENGINEERED IN SITU ANAEROBIC REACTIVE ZONES

(75) Inventor: Suthan S. Suthersan, Yardley, PA (US)

(73) Assignee: Arcadis G & M, Highlands Ranch, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/877,948

(22) Filed: Jun. 8, 2001

Related U.S. Application Data

(60) Continuation of application No. 09/630,790, filed on Aug. 2, 2000, now Pat. No. 6,322,700, which is a continuation of application No. 09/157,819, filed on Sep. 21, 1998, now Pat. No. 6,143,177, which is a continuation-in-part of application No. 08/951,219, filed on Sep. 15, 1997, now abandoned, which is a continuation of application No. 08/661,621, filed on Jun. 11, 1996, now abandoned, which is a division of application No. 08/420,234, filed on Apr. 11, 1995, now Pat. No. 5,554,290.

(51) Int. Cl.$^7$ .................................................. C02F 3/28
(52) U.S. Cl. ........................ 210/610; 210/717; 210/747; 210/903; 210/908; 210/912; 210/913; 435/262.5
(58) Field of Search .................... 210/603, 610, 210/611, 747, 605, 903, 908, 912, 913, 614, 717; 435/262.5, 262

(56) References Cited

U.S. PATENT DOCUMENTS

| | | |
|---|---|---|
| 825,745 A | 7/1906 | Mitchell |
| 1,286,666 A | 12/1918 | Layne |
| 1,877,915 A | 9/1932 | Lewis |
| 2,104,327 A | 1/1938 | Kotzebue ...................... 166/21 |
| 2,180,400 A | 11/1939 | Coberly ........................ 103/46 |
| 2,523,091 A | 9/1950 | Bruce ............................ 166/2 |
| 2,635,696 A | 4/1953 | Asketh ........................... 166/1 |
| 2,765,850 A | 10/1956 | Allen ........................... 166/39 |
| 2,875,831 A | 3/1959 | Martin et al. .................. 166/9 |
| 2,969,226 A | 1/1961 | Huntington ..................... 262/3 |
| 3,216,905 A | 11/1965 | Baptist .......................... 195/2 |

(List continued on next page.)

FOREIGN PATENT DOCUMENTS

DE 3427532 C1 8/1985

OTHER PUBLICATIONS

In Situ Aeration of Groundwater: A Technology Overview—Oct. 16, & 17, 1990.

(List continued on next page.)

Primary Examiner—Christopher Upton
(74) Attorney, Agent, or Firm—Standley & Gilcrest LLP

(57) ABSTRACT

An in situ method and system for reductive dechlorination, the precipitation of chromium, the precipitation of heavy metals, and microbial denitrification. The invention comprises the formation of in situ anaerobic reactive zones to precipitate and filter out dissolved heavy metals as metallic sulfides, to degrade nitrate to nitrogen gas, to reduce chlorinated hydrocarbons to ethene, and to precipitate and filter out chromium. The invention is comprised of an injection well or wells that extend into a contaminated groundwater. A conduit located within the injection well conveys a reagent to the contaminated groundwater.

The reagent may be a carbohydrate rich solution. Microbes digest the carbohydrates to produce sulfate reducing and methanogenic conditions within the reactive zone that include a dissolved oxygen level less than about 0.5 mg/l, a redox potential less than about −250 mv, and a dissolved organic carbon to contaminant ratio of greater than about 50:1. These biogeochemical conditions lead to the reduction of PCE to TCE to DCE to VC and eventually to ethene. These biogeochemical conditions also lead to the precipitation of heavy metals, the precipitation of chromium, and microbial denitrification.

13 Claims, 2 Drawing Sheets

U.S. PATENT DOCUMENTS

| | | | |
|---|---|---|---|
| 3,277,962 A | 10/1966 | Flickinger et al. | 166/15 |
| 3,351,132 A | 11/1967 | Dougan et al. | 166/11 |
| 3,547,190 A | 12/1970 | Wilkerson | 166/75 |
| 3,649,533 A | 3/1972 | Reijonen et al. | 210/50 |
| 3,653,438 A | 4/1972 | Wagner | 166/266 |
| 3,665,716 A | 5/1972 | Rogers et al. | 61/35 |
| 3,705,851 A | 12/1972 | Brauer | 210/1 |
| 3,727,686 A | 4/1973 | Prates et al. | 166/261 |
| 3,735,815 A | 5/1973 | Myers | 166/313 |
| 3,765,483 A | 10/1973 | Vencil | 166/265 |
| 3,796,883 A | 3/1974 | Smith et al. | 250/260 |
| 3,823,777 A | 7/1974 | Allen et al. | 166/266 |
| 3,828,525 A | 8/1974 | Copa et al. | 55/68 |
| 3,846,290 A | 11/1974 | Raymond | 210/610 |
| 3,980,138 A | 9/1976 | Knopik | 166/314 |
| 3,990,513 A | 11/1976 | Perch | 166/267 |
| 4,016,930 A | 4/1977 | Arnold | 166/266 |
| 4,026,355 A | 5/1977 | Johnson et al. | 166/246 |
| 4,126,556 A | 11/1978 | Swanson et al. | 210/242 |
| 4,167,973 A | 9/1979 | Forte et al. | 166/267 |
| 4,183,407 A | 1/1980 | Knopik | 166/314 |
| 4,241,787 A | 12/1980 | Price | 166/105 |
| 4,283,212 A | 8/1981 | Graham et al. | 62/18 |
| 4,296,810 A | 10/1981 | Price | 166/265 |
| 4,303,127 A | 12/1981 | Freel et al. | 166/266 |
| 4,306,961 A | 12/1981 | Taciuk | 208/11 R |
| 4,323,122 A | 4/1982 | Knopik | 166/267 |
| 4,366,846 A | 1/1983 | Curati, Jr. | 141/1 |
| 4,369,839 A | 1/1983 | Freeman et al. | 166/53 |
| 4,401,569 A | 8/1983 | Jhaveri et al. | 210/610 |
| 4,435,292 A | 3/1984 | Kirk et al. | 210/747 |
| 4,442,901 A | 4/1984 | Zison | 166/369 |
| 4,469,176 A | 9/1984 | Zison et al. | 166/250 |
| 4,510,243 A * | 4/1985 | Haga et al. | 210/614 |
| 4,518,399 A | 5/1985 | Croskell et al. | 55/16 |
| 4,544,381 A | 10/1985 | Schmidt | 55/89 |
| 4,574,062 A | 3/1986 | Weitman | 261/147 |
| 4,576,717 A | 3/1986 | Collin et al. | 210/610 |
| 4,588,506 A | 5/1986 | Raymond et al. | 210/606 |
| 4,593,760 A | 6/1986 | Visser et al. | 166/267 |
| 4,625,801 A | 12/1986 | McLaughlin et al. | 166/267 |
| 4,660,639 A | 4/1987 | Visser et al. | 166/267 |
| 4,662,900 A | 5/1987 | Ottengraf | 55/90 |
| 4,664,805 A * | 5/1987 | Focht | 210/611 |
| 4,683,064 A | 7/1987 | Hallberg et al. | 210/747 |
| 4,713,343 A * | 12/1987 | Wilson, Jr. et al. | 210/611 |
| 4,715,965 A | 12/1987 | Sigerson et al. | 210/800 |
| 4,723,968 A | 2/1988 | Schippert et al. | 55/80 |
| 4,730,672 A | 3/1988 | Payne | 166/266 |
| 4,738,206 A | 4/1988 | Noland | 110/346 |
| 4,745,850 A | 5/1988 | Bastian et al. | 98/56 |
| 4,749,491 A * | 6/1988 | Lawes et al. | 210/610 |
| 4,755,304 A * | 7/1988 | Hallberg et al. | 210/747 |
| 4,765,902 A | 8/1988 | Ely et al. | 210/610 |
| 4,780,215 A | 10/1988 | Carlson | 210/722 |
| 4,782,625 A | 11/1988 | Gerken et al. | 47/1.42 |
| 4,799,878 A | 1/1989 | Schaeffer | 431/202 |
| 4,806,148 A | 2/1989 | Ottengraf | 55/223 |
| 4,832,122 A | 5/1989 | Corey et al. | 166/266 |
| 4,832,711 A | 5/1989 | Christel, Jr. et al. | 55/20 |
| 4,842,448 A | 6/1989 | Koerner et al. | 405/258 |
| 4,846,134 A | 7/1989 | Perry et al. | 123/520 |
| 4,846,852 A | 7/1989 | Schweitzer et al. | 55/31 |
| 4,848,460 A | 7/1989 | Johnson, Jr. et al. | 166/245 |
| 4,850,745 A | 7/1989 | Hater et al. | 405/258 |
| 4,864,942 A | 9/1989 | Fochtman et al. | 110/226 |
| RE33,102 E | 10/1989 | Visser et al. | 166/267 |
| 4,872,994 A | 10/1989 | Jakob | 210/691 |
| 4,886,119 A | 12/1989 | Bernhardt et al. | 166/267 |
| 4,890,673 A | 1/1990 | Payne | 166/266 |
| 4,892,688 A | 1/1990 | Bernhardt | 261/24 |
| 4,895,085 A | 1/1990 | Chips | 110/346 |
| 4,919,570 A | 4/1990 | Payne | 405/128 |
| 4,943,305 A | 7/1990 | Bernhardt | 55/170 |
| 4,945,988 A | 8/1990 | Payne et al. | 166/266 |
| 4,950,394 A | 8/1990 | Bernhardt et al. | 210/170 |
| 4,951,417 A | 8/1990 | Gerken et al. | 47/1.42 |
| 4,954,258 A * | 9/1990 | Little | 210/610 |
| 4,966,611 A | 10/1990 | Schumacher et al. | 55/20 |
| 4,982,788 A | 1/1991 | Donnelly | 166/266 |
| 5,006,250 A * | 4/1991 | Roberts et al. | 210/610 |
| 5,009,266 A | 4/1991 | Dieter | 166/245 |
| 5,015,365 A | 5/1991 | Vara et al. | 208/262.1 |
| 5,017,289 A | 5/1991 | Ely et al. | 210/610 |
| 5,050,676 A | 9/1991 | Hess et al. | 166/267 |
| 5,069,286 A | 12/1991 | Roensch et al. | 166/312 |
| 5,076,360 A | 12/1991 | Morrow | 166/267 |
| 5,076,727 A | 12/1991 | Johnson et al. | 405/128 |
| 5,080,793 A | 1/1992 | Urlings | 210/603 |
| 5,086,717 A | 2/1992 | McCrossan | 110/346 |
| 5,095,975 A | 3/1992 | Bernhardt | 166/67 |
| 5,111,883 A | 5/1992 | Savery | 166/269 |
| 5,116,163 A | 5/1992 | Bernhardt | 405/128 |
| 5,122,165 A | 6/1992 | Wang et al. | 55/38 |
| 5,122,166 A | 6/1992 | Hyrcyk et al. | 55/38 |
| 5,143,606 A | 9/1992 | Bernhardt | 210/701 |
| 5,143,607 A | 9/1992 | Bernhardt | 210/170 |
| 5,147,535 A | 9/1992 | Bernhardt | 210/138 |
| 5,161,914 A | 11/1992 | Rahn et al. | 405/128 |
| 5,171,103 A | 12/1992 | Bernhardt | 405/128 |
| 5,172,764 A | 12/1992 | Hajali et al. | 166/267 |
| 5,173,092 A | 12/1992 | Rudder | 55/53 |
| 5,180,503 A | 1/1993 | Gorelick et al. | 210/758 |
| 5,183,563 A | 2/1993 | Rodden | 210/180 |
| 5,185,080 A | 2/1993 | Boyle | 210/903 |
| 5,197,541 A | 3/1993 | Hess et al. | 166/67 |
| 5,220,958 A | 6/1993 | Bernhardt | 166/67 |
| 5,221,159 A | 6/1993 | Billings et al. | 405/128 |
| 5,263,795 A | 11/1993 | Corey et al. | 405/128 |
| 5,277,815 A | 1/1994 | Beeman | 210/605 |
| 5,279,740 A * | 1/1994 | Basile et al. | 210/747 |
| 5,281,333 A | 1/1994 | Bernhardt | 210/170 |
| 5,302,286 A * | 4/1994 | Semprini et al. | 210/610 |
| 5,318,698 A | 6/1994 | Bernhardt | 210/150 |
| 5,330,651 A | 7/1994 | Robertson et al. | 210/747 |
| 5,358,357 A | 10/1994 | Mancini et al. | 405/128 |
| 5,382,267 A | 1/1995 | Savage et al. | 44/623 |
| 5,384,048 A * | 1/1995 | Hazen et al. | 210/747 |
| 5,389,267 A | 2/1995 | Gorelick et al. | 210/758 |
| 5,402,848 A | 4/1995 | Kelly | 166/266 |
| 5,425,598 A | 6/1995 | Pennington | 405/118 |
| 5,439,594 A | 8/1995 | Regan et al. | 210/747 |
| 5,441,365 A | 8/1995 | Duffney et al. | 405/128 |
| 5,441,641 A * | 8/1995 | Vail et al. | 210/747 |
| 5,456,550 A * | 10/1995 | Devlin | 210/747 |
| 5,480,549 A * | 1/1996 | Looney et al. | 210/610 |
| 5,482,630 A * | 1/1996 | Lee et al. | 210/614 |
| 5,545,801 A | 8/1996 | Fulton | 588/249 |
| 5,545,803 A | 8/1996 | Heath et al. | 588/253 |
| 5,554,290 A | 9/1996 | Suthersan | 210/610 |
| 5,575,589 A | 11/1996 | Suthersan | 405/128 |
| 5,588,490 A | 12/1996 | Suthersan et al. | 166/370 |
| 5,698,092 A | 12/1997 | Chen | 210/94 |
| 5,713,522 A | 2/1998 | Lundberg | 239/265.39 |
| 5,753,122 A * | 5/1998 | Taylor et al. | 210/611 |
| 5,833,388 A | 11/1998 | Edwards et al. | 405/52 |
| 5,833,855 A * | 11/1998 | Saunders | 210/611 |
| 5,893,975 A | 4/1999 | Eifert | 210/602 |
| 6,007,274 A | 12/1999 | Suthersan | 405/128 |
| 6,150,157 A * | 11/2000 | Keasling et al. | 435/262.5 |

OTHER PUBLICATIONS

Proceedings of the NWWA/API Conference on Petroleum Hydrocarbons and Organic Chemicals in Ground Water—Prevention, Detection and Restoration—Nov. 13–15, 1985.

Fifth National Outdoor Action Conference on Aquifer Restoration, Ground Water Monitoring, and Geophysical Methods—May 13–16, 1991 (Ground Water Mgmt., Book 5 of the Series).

The Fifth National Symposium and Exposition of Aquifer Restoration and Ground Water Monitoring—May 21–24, 1985.

Haztech International '88—Hazardous Waste & Hazardous Materials Management—Sep. 20–22, 1988.

Vol. II, Proceedings of Petroleum Hydrocarbons and Organic Chemicals in Ground Water: Prevention, Detection and Restoration—Nov. 9–11, 1988.

Public Notice (3 pages).

Declaration Statement—Record of Decision; Rod Decision Summary (with attachments); and Responsive Summary, Upjohn Manufacturing Company, Superfund Site, Barceloneta, Puerto Rico.

Lexis Nexis—Environmental Protection Agency, Upjohn Manufacturing Company—Sep. 30, 1988.

Near Surface Geochemical Monitoring of Underground Gas Storage Facilities—Apr., 1986.

SPL External Vapor Vending (Elimination) Program—Nov. 2, 1983.

Water Well Technology—Field Principals of Exploration Drilling and Development of Ground Water and Other Selected Minerals (4 page cover and pp. 240–308) (Michael D. Campbell and Jay H. Lehr).

Ground Water and Wells—A Reference Book for the Water-Well Industry—4th Printing 1975, Chapter 10, pp. 185–208 and Chapter 20, pp. 375–394.

Hydrogeologic and Geochemical Investigation, Mt. Olive Greens, Mt. Olive Township, N.J.—Nov., 1982.

A Monitoring and Removal Program for Leaked Propane Gas in the Vadose (Unsaturated) Zone: A Case Study (Thomas Lobasso, Jr. and Andrew J. Barber).

\* cited by examiner

ENGINEERED IN SITU ANAEROBIC REACTIVE ZONES

This is, a continuation of U.S. application Ser. No. 09/630,790 filed Aug. 2, 2000, now U.S. Pat. No. 6,322,700. U.S. application Ser. No. 09/630,790 is a continuation of U.S. application Ser. No. 09/157,819 filed Sep. 21, 1998, now U.S. Pat. No. 6,143,177. U.S. application Ser. No. 09/157,819 is a continuation-in-part of U.S. application Ser. No. 08/951,219, filed Sep. 15, 1997, now abandoned. U.S. application Ser. No. 08/951,219 is a continuation of U.S. application Ser. No. 08/661,621, filed Jun. 11, 1996, now abandoned. U.S. application Ser. No. 08/661,621 was a divisional of U.S. application Ser. No. 08/420,234, filed Apr. 11, 1995, now U.S. Pat. No. 5,554,290.

BACKGROUND AND SUMMARY OF THE INVENTION

The present invention relates generally to a method and apparatus for removing contaminants dissolved in groundwater and, more particularly, to in situ anaerobic reactive zones for removing contaminants dissolved in groundwater.

Contamination of groundwater with potentially hazardous materials is a common problem facing industry, the government, and the general public. Frequently, as a result of spills, leakage from storage facilities, or surface discharges, contaminants percolate into groundwater, thereby posing a threat to drinking water supplies. While groundwater is not as susceptible to pollution as surface water, once polluted, its restoration is difficult and long term. Various methods for withdrawing and treating contaminated groundwater have met with limited success. Typically, groundwater is removed from the saturated zone, treated, and then returned to the saturated zone. These known methods involve great expense and incur risks inherent in treating heavy metals and other contaminants, such as nitrates, present in the sub-surface.

Preferred embodiments of the method and apparatus of the present invention utilize the principle of in situ anaerobic reactive zones for the precipitation of metals, microbial denitrification, reductive dechlorination, and/or the precipitation of chromium. Precipitation is a process of producing a separable solid phase within a liquid medium. The method may involve installing injection wells into the saturated zone of contaminated soil. A substantially impervious well casing may be placed in the borehole with a fluid-permeable section at its base.

In one preferred method of the present invention, a reagent comprised of a carbohydrate rich solution may be metered into the conduit under pressure to facilitate proper mixing and dispersion in the saturated zone to achieve desired sulfate reducing and methanogenic conditions. The present invention may utilize molasses extract, corn syrup, whey cheese, lactose, milk curd, cheese, fat, sugar, fruit juice, vegetable juice, dextrose, maltose, galactose, starch, fructose, sucrose, cornstarch, or vegetable oil as a reagent to introduce carbohydrates. A mixing pump at the base of the conduit may be utilized to provide a more homogeneous mixture within the conduit. The mixture may then permeate through the fluid-permeable screen of the conduit at its base and mix with the surrounding groundwater.

Heterotrophic, sulfate reducing, and denitrifying microorganisms indigenous to the soil microflora may then serve as catalysts for the precipitation of metals, microbial denitrification, reductive dechlorination, and the precipitation of chromium. Two reactions involving microbes may form part of some methods of the present invention. One reaction utilizes the carbohydrates and the dissolved oxygen in the groundwater to form carbon dioxide and water. The result of this reaction causes a depletion in the oxygen level and leads to the formation of substantially anaerobic conditions in the saturated zone. In particular, this reaction preferably reduces the level of dissolved oxygen in the zone being treated to less than about 0.5 mg/l. Furthermore, this reaction preferably creates biogeochemical conditions in the zone being treated that include a redox potential of less than about −250 mv and a dissolved organic carbon to contaminant ratio of greater than about 50:1.

Under the sulfate reducing and methanogenic conditions, the sulfates present may be reduced to form sulfide ions. The sulfide ions may then react with the dissolved heavy metals to form a solid precipitate which eventually is filtered out by the soil matrix. There is no need to remove the precipitate from the soil matrix because it is insoluble and harmless.

As an example, the following reactions are indicative of the process utilizing sugar with sulfate to precipitate dissolved lead, zinc, mercury, and nickel from groundwater:

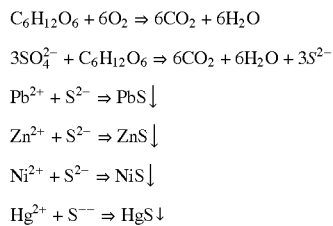

In addition to the precipitation of metals, the aforementioned sulfate reducing and methanogenic conditions caused by the injection of carbohydrates lead to the reduction of chlorinated hydrocarbons. Chlorinated hydrocarbons include tetrachloroethylene (PCE), trichloroethylene (TCE), dichloroethylene (DCE), and vinyl chloride (VC). Each of these chlorinated hydrocarbons can contaminate the groundwater supply. For example, exposure to high levels of PCE and TCE may cause harm to the nervous system, the liver, the kidney, or even death, and VC may be a common and highly carcinogenic groundwater contaminant.

As shown below, the injection of carbohydrates into the saturated zone leads to the reduction of PCE to TCE to DCE to VC and eventually to ethene, a harmless, inert gas. The ethene may eventually be stripped into the soil gas. As a result, a preferred method of the present invention removes dissolved PCE, TCE, DCE, and VC contamination from the groundwater.

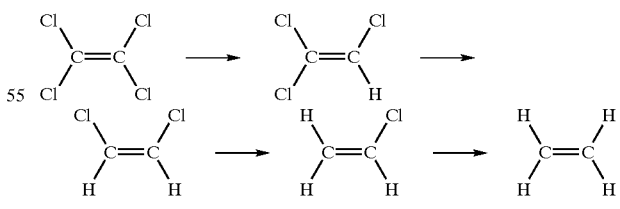

In addition, the injection of carbohydrates to achieve the aforementioned biogeochemical conditions in the saturated zone leads to the precipitation of chromium, another harmful contaminant. In particular, the injection of carbohydrates leads to the reduction of hexavalent chromium to trivalent chromium. Trivalent chromium is then precipitated as chromic hydroxide.

$$Cr^{6+} \rightarrow Cr^{3+}$$

$$Cr^{3+} + 3OH^- \rightarrow Cr(OH)_3$$

The use of molasses extract, corn syrup, whey cheese, lactose, milk curd, cheese, fat, sugar, fruit juice, vegetable juice, dextrose, maltose, galactose, starch, fructose, sucrose, cornstarch, or vegetable oil to achieve each of the above reactions is a unique application. The precipitation of metals and reductive dechlorination in an in situ reactive zone rather than in an above ground aqueous phase reactor is also a unique development. The hydrogeological manipulations used in this invention to cause a homogeneous in situ reactive zone in all three dimensions is also unique. Using the soil matrix itself to filter out the insoluble metal precipitates and the inert gas is also unique.

The in situ reactive zone concept can also be applied to microbially denitrify the dissolved nitrates ($NO^-_3$) to nitrogen gas. The technologies used today to decontaminate dissolved $NO^-_3$ in groundwater involve pumping the contaminated groundwater and using above ground technologies, such as ion exchange beds, reverse osmosis, or anaerobic bioreactors. In this invention, the injection of carbohydrates will create an anaerobic zone due to the depletion of the dissolved oxygen. The carbohydrates may be injected in the form of molasses extract, corn syrup, whey cheese, lactose, milk curd, cheese, fat, sugar, fruit juice, vegetable juice, dextrose, maltose, galactose, starch, fructose, sucrose, cornstarch, or vegetable oil. In the saturated zone, the denitrifying microbial consortia will degrade the $NO^-_3$ ion first to a nitrite ion ($NO^-_2$) and eventually nitrogen ($N_2$) gas. The nitrogen gas, thus formed, will be eventually stripped into the soil gas. As a result, the dissolved nitrate contamination may be removed from the groundwater.

$$C_6H_{12}O_6 + 6O_2 \rightarrow 6CO_2 + 6H_2O$$

$$NO^-_3 \rightarrow NO^-_2 \rightarrow N_2 \uparrow$$

The present invention may be practiced utilizing single injection wells or in multiple clusters depending upon the depth of the saturated zone, the geology of the remediation site, soil properties at the remediation site, and the degree of mixing that may be created by each individual injection well. The geologic and hydrogeologic setting in which in situ reactive zones are installed governs its successful application. In situ reactive zones rely on the delivery of dissolved reagents throughout a contaminant plume. Administering the delivery of the reagent requires a knowledge of the geologic parameters affecting groundwater flow and transport. The ability to control the movement of the injected reagent is imperative at sites with hydraulic conductivity less than 10 E–5 cm/sec. These sites require the addition of a slow releasing reagent such as whey cheese. Faster geologic settings require the addition of a soluble and fast releasing reagent such as molasses. It should be recognized that required microbial cultures may be added to the soil matrix. This may be required where the indigenous microbes are not present in sufficient numbers to initiate the reactions.

In addition to the novel features and advantages mentioned above, other objects and advantages of the present invention will be readily apparent from the following descriptions of the drawings and preferred embodiments.

DETAILED DESCRIPTION OF PREFERRED EMBODIMENT(S)

Figure 1:
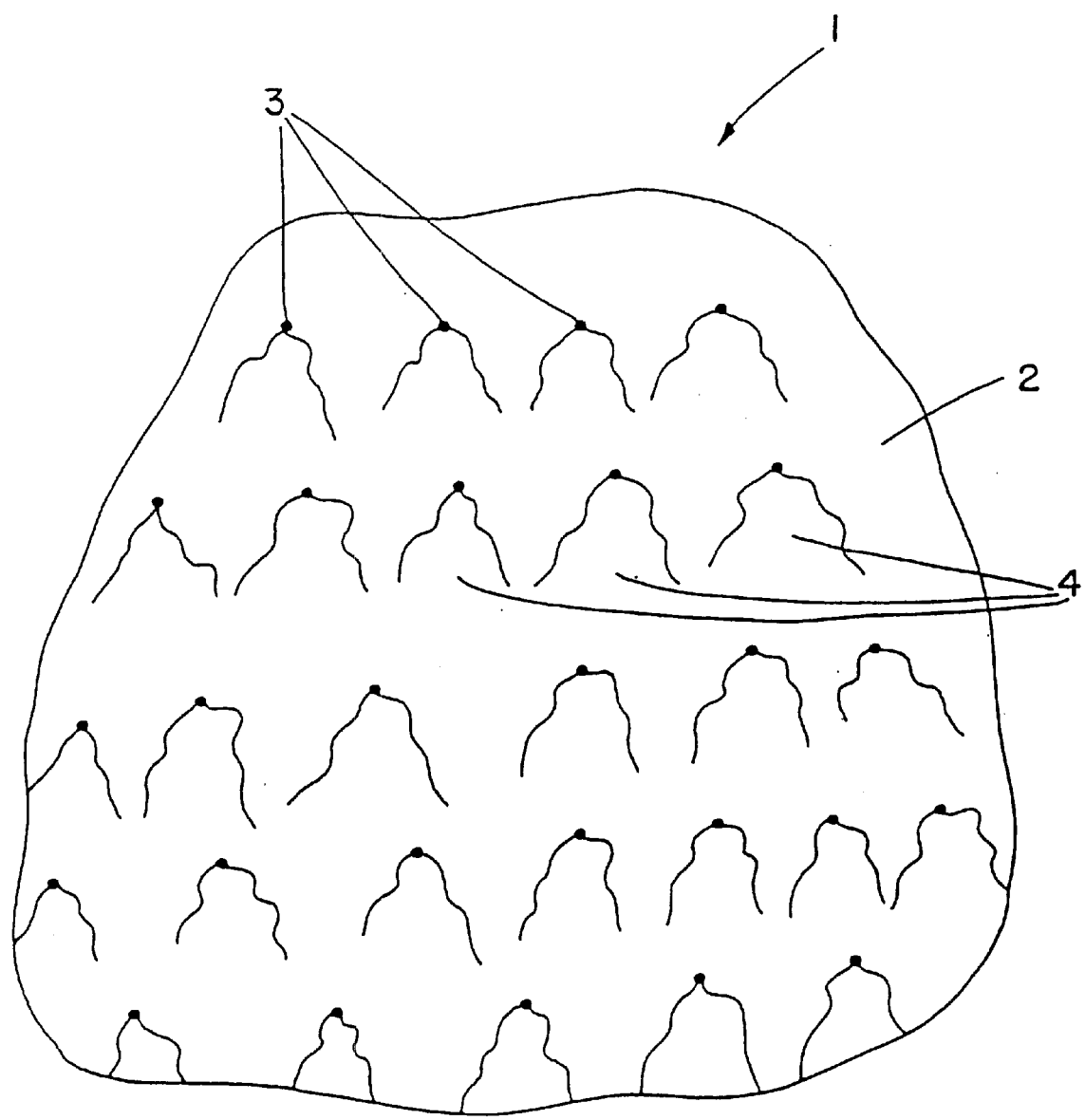
FIG. 1 is a plan view of a preferred embodiment of the present invention.

The present invention is directed to a method and apparatus for achieving the precipitation of metals, microbial denitrification, reductive dechlorination, and/or the precipitation of chromium. FIG. 1 shows a plan view of a preferred embodiment of the present invention in operation at 1 to remediate the contaminant plume 2 consisting of dissolved metals, chlorinated hydrocarbons, or dissolved nitrates. Injection wells 3 are installed to extend below the water table. In situ reactive zones 4 may be created by injecting molasses extract, corn syrup, whey cheese, lactose, milk curd, cheese, fat, sugar, fruit juice, vegetable juice, dextrose, maltose, galactose, starch, fructose, sucrose, cornstarch, or vegetable oil in the case of dissolved metals, chlorinated hydrocarbons, or nitrates.

Figure 2:
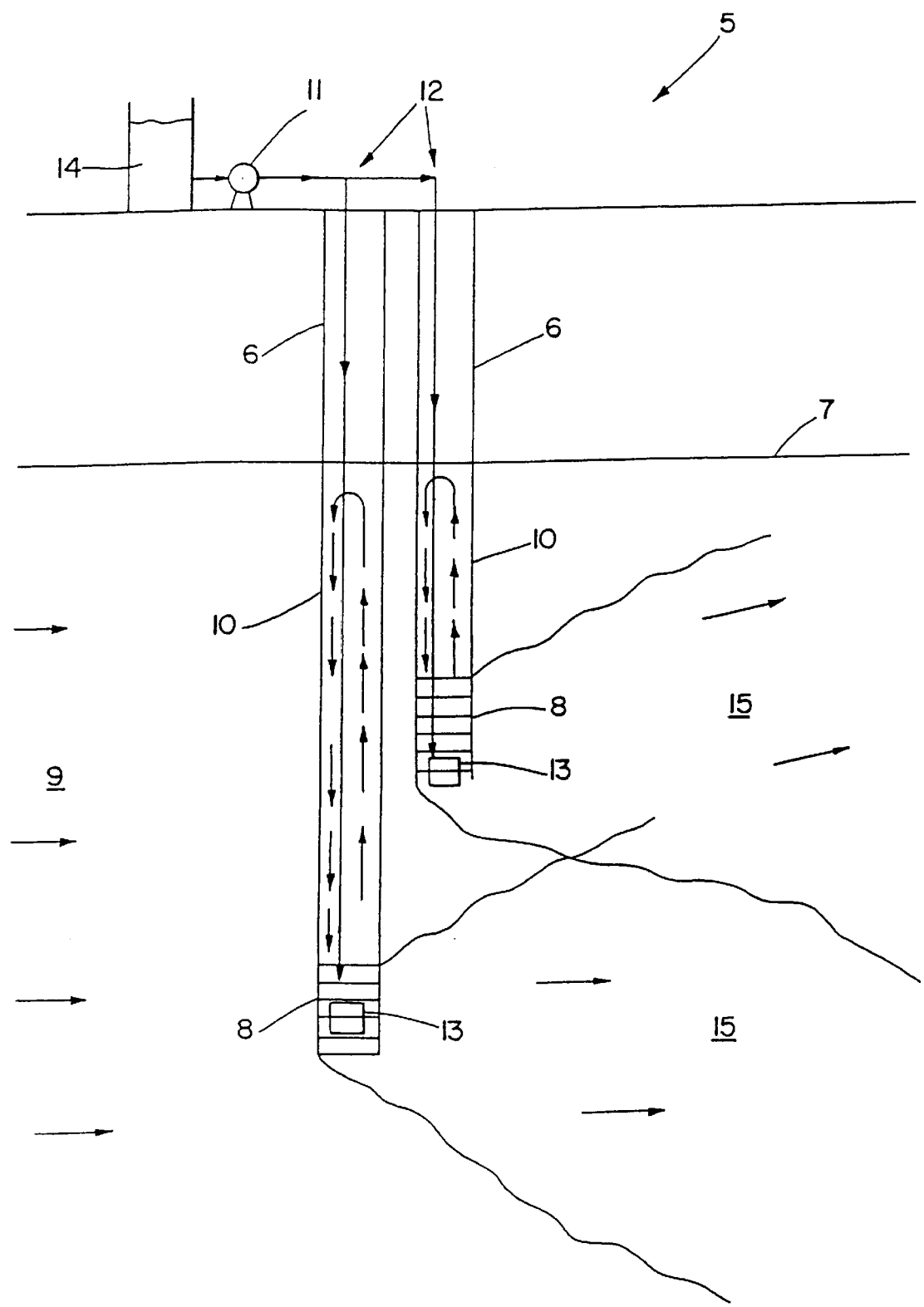
FIG. 2 is a cross sectional view of another embodiment of the present invention.

FIG. 2 shows a cross sectional view of another embodiment of the present invention in operation at 5 to remediate a dissolved contaminant plume. Injection wells 6 are installed to extend below the water table 7, and screens 8 or other similar permeable sections are installed in the contaminated zone 9. The wells include impermeable well sections 10 and the screens 8.

A metering pump 11 is operationally attached in communication with the injection wells 6 at 12. Optionally, mixing pump 13 may be placed within the wells 6 to facilitate mixing of the injected reagents. Reagent stock solution may be held in a holding tank 14.

Operation of the present invention may also be understood with reference to FIG. 2. Metering pump 11 may be operated to provide molasses extract, corn syrup, whey cheese, lactose, milk curd, cheese, fat, sugar, fruit juice, vegetable juice, dextrose, maltose, galactose, starch, fructose, sucrose, cornstarch, or vegetable oil below the water table 7 under pressure. This is to facilitate the reagent to be injected under pressure to form the in situ reactive zones 15 in a homogeneous manner in all three dimensions. If the reagent is fed by gravity alone into the injection wells 6, a two-dimensional reactive zone may only be formed around the top near the water table 7. Mixing pump 13 may be operated to mix the reagent as is shown by the counterclockwise arrows within the conduit.

The indigenous microbes may then digest the carbohydrates utilizing the available dissolved oxygen within the reactive zones 15 to produce carbon dioxide and water, thereby forming anaerobic conditions within the reactive zones 15. The sulfates are then metabolized and converted to sulfide ($S^{2-}$) within these anaerobic reactive zones 15. These sulfide ions then combine with the dissolved heavy metal ($Me^{++}$) ions that contaminate the groundwater to form metallic sulfide precipitates out of the groundwater. The soil matrix within and down gradient of the reactive zone may then filter the precipitates and bind them with the soil matrix.

$$Me^{++} + S^{--} \rightarrow MeS \downarrow$$

The injection of molasses extract, corn syrup, whey cheese, lactose, milk curd, cheese, fat, sugar, fruit juice, vegetable juice, dextrose, maltose, galactose, starch, fructose, sucrose, cornstarch, or vegetable oil creates sulfate reducing and methanogenic conditions which preferably include a level of dissolved oxygen less than about 0.5 mg/l, a redox potential less than about −250 mv, and a dissolved organic carbon to contaminant ratio of greater than about 50:1. As a result, the injection of molasses extract, corn syrup, whey cheese, lactose, milk curd, cheese, fat, sugar, fruit juice, vegetable juice, dextrose, maltose, galactose, starch, fructose, sucrose, cornstarch, or vegetable oil leads to the reduction of PCE to TCE to DCE to VC and eventually to ethene, a harmless, inert gas. In addition, the injection of molasses extract, corn syrup, whey cheese, lactose, milk curd, cheese, fat, sugar, fruit juice, vegetable juice, dextrose, maltose, galactose, starch, fructose, sucrose, cornstarch, or vegetable oil leads to the reduction of hexavalent chromium to trivalent chromium which is then precipitated as chromic hydroxide.

In the case of $NO^-_3$ contaminated plumes, the indigenous microbes will digest the carbohydrates utilizing the available dissolved oxygen within the reactive zones 15 to form $CO_2$ and $H_2O$. Under these anaerobic conditions, the nitrates present in the reactive zones 15 will be converted to $NO^-_2$ (nitrite) and then to nitrogen gas by the indigenous denitrifying microbes.

$$NO^-_3 \rightarrow NO^-_2 \rightarrow N_2$$

The preferred embodiments herein disclosed are not intended to be exhaustive or to unnecessarily limit the scope of the invention. The preferred embodiments were chosen and described in order to explain the principles of the present invention so that others skilled in the art may practice the invention. Having shown and described preferred embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A method for removing contaminants from groundwater, said method comprising the steps of:
   supplying reagent to contaminated groundwater, whereby microorganisms in the contaminated groundwater metabolize said reagent creating an anaerobic condition sufficient to enable dechlorination of said contaminants; and
   maintaining said anaerobic condition while promoting the continuous transformation of a chlorinated compound present in the contaminated groundwater into lesser chlorinated compounds, said transformation resulting in the reduction of said chlorinated compound to a non-chlorinated compound,
   and wherein, under said anaerobic condition, microorganisms in said contaminated groundwater are catalysts for the precipitation of metal compounds.

2. The method of claim 1 wherein said anaerobic condition further leads to the precipitation of trivalent chromium as chromic hydroxide.

3. The method of claim 1 wherein said anaerobic condition further leads to microbial denitrification.

4. The method of claim 1 wherein microorganisms in the contaminated groundwater are catalysts of the reduction of VC to ethene.

5. The method of claim 1 wherein said chlorinated compound is selected from the group consisting of PCE, TCE, DCE, and VC.

6. The method of claim 1 wherein, under said anaerobic condition, microorganisms in the contaminated groundwater are catalysts of microbial denitrification.

7. The method of claim 1 wherein at least a portion of the microorganisms in the contaminated groundwater are supplied to the contaminated groundwater.

8. The method of claim 1 wherein the step of supplying said reagent comprises the step of supplying a carbohydrate rich solution.

9. The method of claim 1 wherein the reagent is selected from the group consisting of molasses extract, corn syrup, whey cheese, lactose, milk curd, cheese, fat, sugar, fruit juice, vegetable juice, dextrose, maltose, galactose, starch, fructose, sucrose, cornstarch, and vegetable oil.

10. The method of claim 1 wherein said anaerobic condition comprises:
    a dissolved oxygen level less than about 0.5 mg/l;
    a redox potential less than about −250 mv; and
    a dissolved organic carbon to contaminant ratio of greater than about 50:1.

11. The method of claim 1 wherein the step of supplying said reagent comprises:
    providing at least one injection well extending from the ground surface to the contaminated groundwater;
    placing a pump in fluid communication with said at least one injection well; and
    operating said pump to force said reagent into the contaminated groundwater.

12. The method of claim 11 further comprising the step of mixing said reagent in said at least one injection well.

13. The method of claim 11 further comprising:
    placing a conduit within said at least one injection well, said conduit having a fluid-permeable section below the water table of the contaminated groundwater;
    wherein said reagent is forcibly expelled from said fluid-permeable, thereby flowing outwardly from said at least one injection well with the natural flow of the contaminated groundwater and creating a three-dimensional reactive zone within the contaminated groundwater.

* * * * *